(12) United States Patent
Ikeda et al.

(10) Patent No.: US 12,173,645 B2
(45) Date of Patent: Dec. 24, 2024

(54) GAS TURBINE PLANT, AND METHOD FOR SUPPLYING FUEL TO SAME

(71) Applicant: MITSUBISHI HEAVY INDUSTRIES, LTD., Tokyo (JP)

(72) Inventors: Ryo Ikeda, Tokyo (JP); Hiromi Ishii, Tokyo (JP); Akira Hattori, Tokyo (JP); Michio Sasaki, Tokyo (JP); Takahiro Sugawara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/266,687

(22) PCT Filed: Feb. 14, 2022

(86) PCT No.: PCT/JP2022/005678
§ 371 (c)(1),
(2) Date: Jun. 12, 2023

(87) PCT Pub. No.: WO2022/173040
PCT Pub. Date: Aug. 18, 2022

(65) Prior Publication Data
US 2024/0093639 A1    Mar. 21, 2024

(30) Foreign Application Priority Data
Feb. 15, 2021    (JP) ................. 2021-021755

(51) Int. Cl.
*F02C 3/28* (2006.01)
*F02C 6/18* (2006.01)
*F23R 3/30* (2006.01)

(52) U.S. Cl.
CPC ................. *F02C 3/28* (2013.01); *F02C 6/18* (2013.01); *F23R 3/30* (2013.01); *F05D 2260/20* (2013.01)

(58) Field of Classification Search
CPC ................. F02C 3/28; F02C 6/18; F23R 3/30
See application file for complete search history.

(56) References Cited

U.S. PATENT DOCUMENTS 5,970,528 A * 10/1999 Shirai ................. E03D 9/08
                                                    4/420.4
6,269,626 B1 * 8/2001 Kim ................. F01K 23/106
                                                    122/7 B
(Continued)

FOREIGN PATENT DOCUMENTS

JP    2001-179053    7/2001
JP    2011-256788    12/2011
(Continued)

OTHER PUBLICATIONS

International Search Report issued Mar. 29, 2022 in International Application No. PCT/JP2022/005678.
(Continued)

*Primary Examiner* — Lorne E Meade
(74) *Attorney, Agent, or Firm* — Wenderoth, Lind & Ponack, L.L.P.

(57) ABSTRACT

This gas turbine plant is provided with a gas turbine and a fuel supply facility. The fuel supply facility is provided with: a liquid ammonia line; a warm water line through which warm water can flow; a vaporizer which can perform the heat exchange between the warm water coming from the warm water line and liquid ammonia coming from the liquid ammonia line to heat and vaporize the liquid ammonia; a heat exchanger which can perform the heat exchange between the warm water in the warm water line and a medium; a heat exchange amount controller which can control the amount of heat exchange between the warm water and the medium to control the temperature of the warm water flowing into the vaporizer; and a gaseous (Continued)

ammonia line which can introduce gaseous ammonia that is ammonia vaporized by the vaporizer into the gas turbine.

12 Claims, 6 Drawing Sheets

(56) References Cited

U.S. PATENT DOCUMENTS

| | | | | |
|---|---|---|---|---|
| 7,487,642 B2* | 2/2009 | Joshi | ................ | F02C 3/305 60/39.55 |
| 2013/0205797 A1* | 8/2013 | Nenmeni | ............ | F02C 7/224 60/776 |
| 2018/0119618 A1* | 5/2018 | Erickson | ............ | F02C 7/224 |

FOREIGN PATENT DOCUMENTS

| | | |
|---|---|---|
| JP | 6245404 | 12/2017 |
| JP | 2020-148357 | 9/2020 |

OTHER PUBLICATIONS

Written Opinion of the International Searching Authority issued Mar. 29, 2022 in International Application No. PCT/JP2022/005678.

* cited by examiner

GAS TURBINE PLANT, AND METHOD FOR SUPPLYING FUEL TO SAME

TECHNICAL FIELD

The present disclosure relates to a gas turbine plant, and a method for supplying fuel to the gas turbine plant.

This application claims the right of priority based on Japanese Patent Application No. 2021-021755 filed with the Japan Patent Office on Feb. 15, 2021, the content of which is incorporated herein by reference.

BACKGROUND ART

A gas turbine plant has a gas turbine and a fuel supply facility that supplies fuel to the gas turbine.

In the gas turbine plant described in PTL 1 below, ammonia is supplied as fuel to a gas turbine. This gas turbine plant includes, in addition to a fuel supply facility that supplies ammonia as fuel to the gas turbine, a heat recovery steam generator that generates steam by utilizing the heat of an exhaust gas from the gas turbine.

The fuel supply facility includes an ammonia tank that stores liquid ammonia, a liquid ammonia line connected to the ammonia tank, a warm water line through which warm water flows, a vaporizer, a flow rate regulating valve that regulates the flow rate of warm water flowing into the vaporizer, and a gaseous ammonia line that leads the gaseous ammonia to the gas turbine. The vaporizer is connected to an end of the liquid ammonia line. The vaporizer performs heat exchange between the warm water from the warm water line and liquid ammonia from the liquid ammonia line to heat and vaporize the liquid ammonia.

The vaporizer has a heat transfer tube through which ammonia flows, and a vaporizer casing that covers the heat transfer tube and temporarily stores the warm water. The warm water line has a warm water heater that is disposed in the heat recovery steam generator and that heats the warm water via heat exchange between the warm water and the exhaust gas, a high-temperature water line that leads the high-temperature water heated by the warm water heater into the vaporizer casing, and a low-temperature water line that connects the vaporizer casing and the warm water heater. A flow rate regulating valve is provided in the high-temperature water line.

In this fuel supply facility, the temperature of the warm water in the vaporizer casing is maintained within a target temperature range by regulating the flow rate of the warm water flowing into the vaporizer casing with the flow rate regulating valve. Then, heat exchange between the warm water in the vaporizer casing and the liquid ammonia flowing in the heat transfer tube is performed.

CITATION LIST

Patent Literature

[PTL 1] Japanese Patent No. 6245404

SUMMARY OF INVENTION

Technical Problem

The temperature of the exhaust gas flowing through the heat recovery steam generator changes according to a change in the operation situation of the gas turbine. Therefore, in the technique described in PTL 1, even if the flow rate of the warm water flowing into the vaporizer casing changes in an environment where the temperature of the exhaust gas changes, the heat exchange amount between the liquid ammonia and the warm water is not proportional to the flow rate of the warm water, making it difficult to control the heat exchange amount. Therefore, in the technique described in PTL 1, it is considered that the required production amount of the gaseous ammonia may not be secured.

Therefore, an object of the present disclosure is to provide a technique capable of easily obtaining the production amount of gaseous ammonia that is required by a gas turbine.

Solution to Problem

A gas turbine plant as an aspect for achieving the above object includes a gas turbine that burns fuel and is capable of being driven by a combustion gas generated by combustion of the fuel, a heat recovery steam generator capable of generating steam by utilizing heat of an exhaust gas from the gas turbine, and a fuel supply facility capable of supplying ammonia as the fuel to the gas turbine. The fuel supply facility includes a liquid ammonia line connected to an ammonia tank capable of storing liquid ammonia, a warm water line through which warm water flows, a vaporizer connected to an end of the liquid ammonia line and capable of heating and vaporizing the liquid ammonia via heat exchange between the warm water from the warm water line and the liquid ammonia, a heat exchanger capable of performing heat exchange between the warm water in the warm water line and a medium, a heat exchange amount regulator capable of regulating a heat exchange amount between the warm water and the medium to adjust a temperature of the warm water flowing into the vaporizer, and a gaseous ammonia line capable of leading gaseous ammonia, which is ammonia vaporized in the vaporizer, to the gas turbine. The vaporizer has an ammonia inlet, an ammonia outlet, a warm water inlet, and a warm water outlet. The liquid ammonia line is connected to the ammonia inlet of the vaporizer. The gaseous ammonia line is connected to the ammonia outlet of the vaporizer. The warm water line has a warm water heater that is disposed in the heat recovery steam generator and that heats the warm water via heat exchange between the warm water and the exhaust gas, and a high-temperature water line that connects the warm water heater and the warm water inlet of the vaporizer. The heat exchanger is provided in the high-temperature water line.

In this aspect, the warm water heated by the heat exchange between the warm water and the exhaust gas in the warm water heater flows into the vaporizer after being temperature-regulated. In the vaporizer, heat exchange between the temperature-regulated warm water and the liquid ammonia is performed to vaporize the ammonia. Since the exhaust gas temperature at the outlet of the gas turbine changes according to a change in the operation situation of the gas turbine, the temperature at the inlet of the warm water heater in the heat recovery steam generator changes according to the operation situation of the gas turbine. Therefore, if the temperature of the exhaust gas changes, the temperature of the warm water heated by the warm water heater also changes. However, in this aspect, as described above, the warm water heated by the warm water heater flows into the vaporizer after being temperature-regulated. Therefore, in this aspect, even if the temperature of the exhaust gas changes, all of the liquid ammonia that has flowed into the vaporizer can be easily converted into gaseous ammonia.

Further, the amount of gaseous ammonia required by the gas turbine also changes according to a change in the operation situation of the gas turbine. In this aspect, even if the amount of gaseous ammonia required by the gas turbine changes, all of the liquid ammonia flowing into the vaporizer can be easily converted into gaseous ammonia by changing the temperature of the warm water flowing into the vaporizer.

Therefore, in this aspect, even if the operation situation of the gas turbine changes, the production amount of gaseous ammonia required by the gas turbine can be easily obtained. Further, in this aspect, it is possible to enhance the responsiveness of the production amount of gaseous ammonia to a change in the operation situation of the gas turbine.

A method for supplying fuel to a gas turbine plant as an aspect for achieving the above object is a method for supplying fuel to a gas turbine plant that includes a gas turbine that burns fuel and is capable of being driven by a combustion gas generated by combustion of the fuel, and a heat recovery steam generator capable of generating steam by utilizing heat of an exhaust gas from the gas turbine, the method including: a warm water heating step of performing heat exchange between warm water in a warm water heater disposed in the heat recovery steam generator and the exhaust gas outside the warm water heater in the heat recovery steam generator to heat the warm water; a heat exchange step of performing heat exchange between the warm water heated in the warm water heating step and a medium; a heat exchange amount regulating step of regulating a heat exchange amount between the warm water heated in the warm water heating step and the medium; a vaporization step of performing heat exchange between the warm water after the heat exchange amount with the medium has been regulated in the heat exchange amount regulating step and liquid ammonia from an ammonia tank storing the liquid ammonia to vaporize the liquid ammonia in a vaporizer; and a fuel supply step of supplying gaseous ammonia, which is ammonia vaporized in the vaporization step, to the gas turbine as fuel. In the heat exchange amount regulating step, a temperature of the warm water flowing into the vaporizer is regulated by regulating the heat exchange amount between the warm water and the medium in the heat exchange step.

Also in this aspect, as in the aspect of the gas turbine plant, even if the operation situation of the gas turbine changes, it is possible to easily obtain the production amount of gaseous ammonia required by the gas turbine. Further, also in this aspect, it is possible to enhance the responsiveness of the production amount of gaseous ammonia to a change in the operation situation of the gas turbine.

Advantageous Effects of Invention

In an aspect of the present disclosure, it is possible to obtain the production amount of gaseous ammonia that is required by a gas turbine.

DESCRIPTION OF EMBODIMENTS

Hereinafter, various embodiments and various modification examples according to the present disclosure will be described using the drawings.

First Embodiment

Hereinafter, a first embodiment of a gas turbine plant according to the present disclosure will be described using FIGS. 1 to 4.

Figure 1:
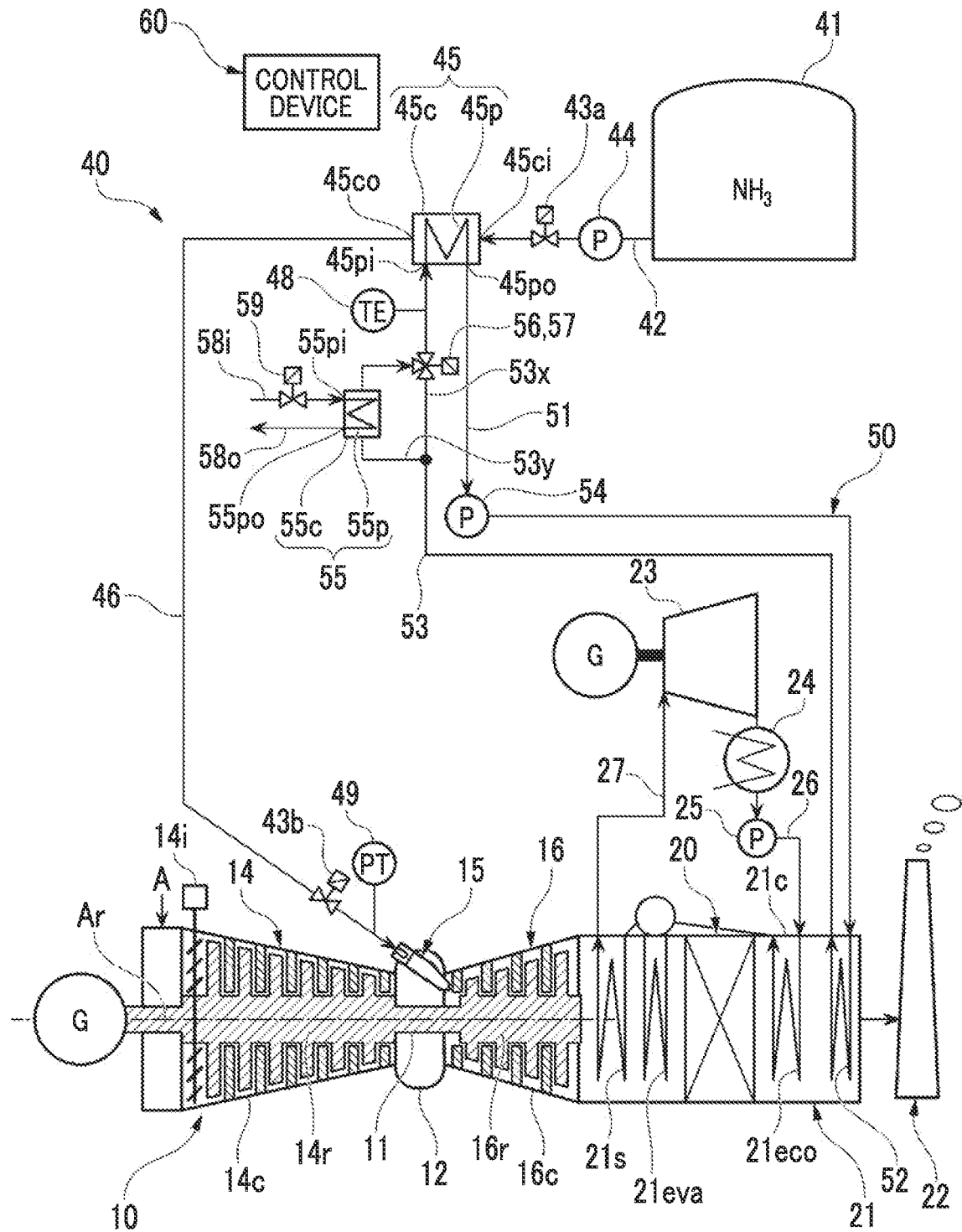
FIG. 1 is a system diagram of a gas turbine plant in a first embodiment according to the present disclosure.

As shown in FIG. 1, the gas turbine plant of the present embodiment includes a gas turbine 10, a denitration device 20 that decomposes NOx contained in an exhaust gas from the gas turbine 10, a heat recovery steam generator 21 that generates steam by utilizing the heat of the exhaust gas flowing out from the denitration device 20, a chimney 22 that exhausts the exhaust gas from the heat recovery steam generator 21 to the outside, a steam turbine 23 that is driven by steam from the heat recovery steam generator 21, a condenser 24 that converts the steam from the steam turbine 23 back to water, a pump 25 that sends the water in the condenser 24 to the heat recovery steam generator 21, a fuel supply facility 40 that supplies fuel to the gas turbine 10, and a control device 60. Therefore, the gas turbine plant of the present embodiment is a combined cycle plant.

The gas turbine 10 includes a compressor 14 that compresses air A, a combustor 15 that burns fuel in the air compressed by the compressor 14 to generate a combustion gas, and a turbine 16 that is driven by the high-temperature and high-pressure combustion gas.

The compressor 14 includes a compressor rotor 14r that rotates with a rotor axis Ar as a center, a compressor casing 14c that covers the compressor rotor 14r, and an intake air amount regulator (hereinafter referred to as IGV (inlet guide vane)) 14i provided in a suction port of the compressor casing 14c. The IGV 14i regulates the flow rate of air that is sucked into the compressor casing 14c according to an instruction from the control device 60. The turbine 16 has a turbine rotor 16r that rotates with the rotor axis Ar as a center by means of the combustion gas from the combustor 15, and a turbine casing 16c that covers the turbine rotor 16r. The turbine rotor 16r and the compressor rotor 14r are connected to each other to be rotatable with the same rotor axis Ar as a center to form a gas turbine rotor 11. For example, a rotor of a generator is connected to the gas turbine rotor 11.

The gas turbine 10 further includes an intermediate casing 12. The intermediate casing 12 is disposed between the compressor casing 14c and the turbine casing 16c in a direction in which the rotor axis Ar extends, and connects the compressor casing 14c and the turbine casing 16c. The compressed air discharged from the compressor 14 flows into the intermediate casing 12. Further, the combustor 15 is fixed to the intermediate casing 12.

Ammonia is supplied to the denitration device 20. The denitration device 20 uses this ammonia to decompose NOx contained in the exhaust gas from the gas turbine 10 into nitrogen and water vapor.

The heat recovery steam generator 21 has a boiler casing 21c through which the exhaust gas from the denitration device 20 flows, an economizer 21eco, an evaporator 21eva, and a superheater 21s. The economizer 21eco, the evaporator 21eva, and the superheater 21s are disposed in the order of the economizer 21eco, the evaporator 21eva, and the superheater 21s from a downstream side toward an upstream side in the flow of the exhaust gas flowing in the boiler casing 21c. The economizer 21eco, the evaporator 21eva, and the superheater 21s have heat transfer tubes that perform heat exchange between the exhaust gas flowing in the boiler casing 21c and water or steam. The economizer 21eco heats the water via the heat exchange between the exhaust gas flowing in the boiler casing 21c and the water to generate warm water. The evaporator 21eva heats the warm water via the heat exchange between the exhaust gas flowing in the boiler casing 21c and the warm water from the economizer 21eco to generate steam. The superheater 21s heats the steam via the heat exchange between the exhaust gas flowing in the boiler casing 21c and the steam from the evaporator 21eva to generate superheated steam.

The economizer 21eco of the heat recovery steam generator 21 and the condenser 24 are connected by a water supply line 26. The water supply line 26 is provided with the pump 25 that sends the water in the condenser 24 to the heat recovery steam generator 21. The superheater 21s of the heat recovery steam generator 21 and the steam turbine 23 are connected by a main steam line 27. The superheated steam from the heat recovery steam generator 21 is sent to the steam turbine 23 through the main steam line 27. For example, a rotor of a generator is connected to the rotor of the steam turbine 23. The steam exhausted from the steam turbine 23 is converted back to water by the condenser 24.

The denitration device 20 is disposed, for example, at a position around the evaporator 21eva within the boiler casing 21c. Ammonia is supplied to the denitration device 20. The denitration device 20 uses this ammonia to decompose NOx contained in the exhaust gas from the gas turbine 10 into nitrogen and water vapor.

The fuel supply facility 40 includes an ammonia tank 41, a liquid ammonia line 42, a liquid ammonia regulating valve 43a, a fuel regulating valve 43b, an ammonia pump 44, a vaporizer 45, a gaseous ammonia line 46, a warm water line 50, a warm water pump 54, a heat exchanger 55, a heat exchange amount regulator 56, a medium line 58i, a medium recovery line 58o, and a medium flow rate regulator 59.

Liquid ammonia is stored in the ammonia tank 41. One end of the liquid ammonia line 42 is connected to the ammonia tank 41. The liquid ammonia line 42 is provided with the ammonia pump 44 that pressurizes the liquid ammonia from the ammonia tank 41, and the liquid ammonia regulating valve 43a that regulates the flow rate of the liquid ammonia flowing through the liquid ammonia line 42.

The vaporizer 45 is a heat exchanger that performs heat exchange between the warm water and the liquid ammonia to heat and vaporize the liquid ammonia. The vaporizer 45 has a heat transfer tube 45p through which the warm water flows, and a vaporizer casing 45c that covers the heat transfer tube 45p and temporarily stores the liquid ammonia.

One end of the heat transfer tube 45p forms a warm water inlet 45pi, and the other end of the heat transfer tube 45p forms a warm water outlet 45po. The vaporizer casing 45c has an ammonia inlet 45ci and an ammonia outlet 45co. The other end of the liquid ammonia line 42 described above is connected to the ammonia inlet 45ci of the vaporizer 45. One end of the gaseous ammonia line 46 is connected to the ammonia outlet 45co of the vaporizer 45. The other end of the gaseous ammonia line 46 is connected to the combustor 15. The gaseous ammonia line 46 is provided with the fuel regulating valve 43b that regulates the flow rate of the gaseous ammonia as fuel flowing into the combustor 15.

The warm water line 50 has a low-temperature water line 51, a warm water heater 52, and a high-temperature water line 53. The warm water heater 52 is disposed at a position on the downstream side of the exhaust gas flow with respect to the economizer 21eco inside the boiler casing 21c. The low-temperature water line 51 connects the warm water outlet 45po of the vaporizer 45 and the warm water heater 52. The warm water pump 54 is provided in the low-temperature water line 51. The high-temperature water line 53 has a main high-temperature water line 53x connecting the warm water heater 52 and the warm water inlet 45pi of the vaporizer 45, and a branch high-temperature water line 53y branched from the main high-temperature water line 53x and then connected to the main high-temperature water line 53x.

The warm water line 50 and the heat transfer tube 45p of the vaporizer 45 form a warm water circulation line through which the warm water circulates. The flow rate of the warm water circulating through the warm water circulation line is controlled by the warm water pump 54 and is substantially constant.

The heat exchanger 55 performs heat exchange between a medium such as cooling water and the warm water. The heat exchanger 55 has a heat transfer tube 55p through which the medium flows, and a heat exchanger casing 55c that covers the heat transfer tube 55p and temporarily stores the warm water. One end of the heat transfer tube 55p forms a medium inlet 55pi, and the other end of the heat transfer tube 55p forms a medium outlet 55po. The medium line 58i is connected to the medium inlet 55pi. The medium line 58i is provided with the medium flow rate regulator 59 that regulates the flow rate of the medium flowing through the medium line 58i. The medium recovery line 58o is connected to the medium outlet 55po. The heat exchanger casing 55c is provided in the branch high-temperature water line 53y. Therefore, the high-temperature water from the branch high-temperature water line 53y flows into the heat exchanger casing 55c. The medium flowing into the heat exchanger 55 may be liquid such as river water, seawater, or industrial water, or gas such as air.

The heat exchange amount regulator 56 has a three-way valve 57 as a flow rate ratio regulator that regulates the ratio between the flow rate of the warm water flowing between the branch position of the branch high-temperature water line 53y and the connection position of the branch high-temperature water line 53y and the flow rate of the warm water flowing through the branch high-temperature water line 53y, in the main high-temperature water line 53x. The three-way valve 57 is provided at a connection position between the main high-temperature water line 53x and the branch high-temperature water line 53y. The flow rate ratio regulator may not be the three-way valve 57 and may be composed of a main high-temperature water regulating valve provided between the branch position of the branch high-temperature water line 53y and the connection position of the branch high-temperature water line 53y in the main high-temperature water line 53x, and a branch high-temperature water regulating valve provided in the branch high-temperature water line 53y.

A temperature sensor 48 is provided between the three-way valve 57 and the vaporizer 45 in the main high-temperature water line 53x to detect the temperature of the high-temperature water flowing between the three-way valve 57 and the vaporizer 45. The gaseous ammonia line 46 is provided with a pressure sensor 49 that detects the pressure of the gaseous ammonia flowing through this line.

Figure 2:
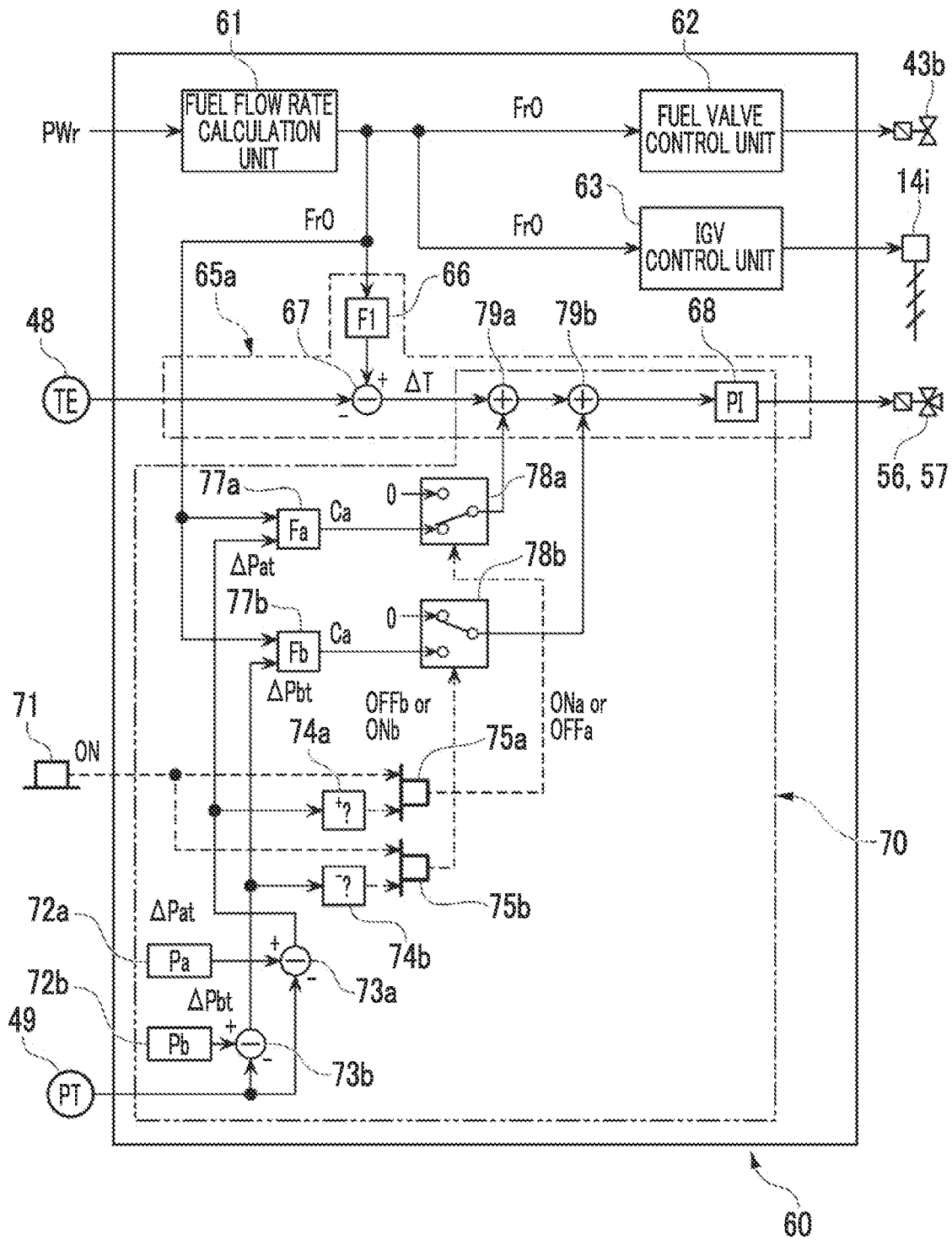
FIG. 2 is a functional block diagram of a control device in the first embodiment according to the present disclosure.

The control device 60 includes a fuel flow rate calculation unit 61, a fuel valve control unit 62, an IGV control unit 63, a temperature control system 65, and a pressure control system 70, as shown in FIG. 2.

The fuel flow rate calculation unit 61 receives required output PWr for the gas turbine 10 from the outside. The fuel flow rate calculation unit 61 obtains a fuel flow rate corresponding to the required output PWr and outputs a fuel flow rate command Fro indicating the fuel flow rate. The fuel flow rate obtained by the fuel flow rate calculation unit 61 has a positive correlation with the required output PWr. That is, if the required output PWr increases, the fuel flow rate obtained by the fuel flow rate calculation unit 61 also increases.

The fuel valve control unit 62 controls the degree of opening of the fuel regulating valve 43b according to the fuel flow rate command Fro. The IGV control unit 63 controls the degree of opening of the IGV 14i according to the fuel flow rate command Fro. Specifically, the IGV control unit 63 controls the IGV opening degree such that the IGV opening degree has a positive correlation with the fuel flow rate indicated by the fuel flow rate command Fro. In the liquid ammonia regulating valve 43a, a valve opening degree thereof changes according to the amount of liquid ammonia in the vaporizer casing 45c. Specifically, if the amount of liquid ammonia in the vaporizer casing 45c decreases, the liquid ammonia regulating valve 43a is opened to replenish the liquid ammonia.

The temperature control system 65 includes a target temperature calculator 66, a temperature deviation calculator 67, and a PI controller 68.

Figure 3:
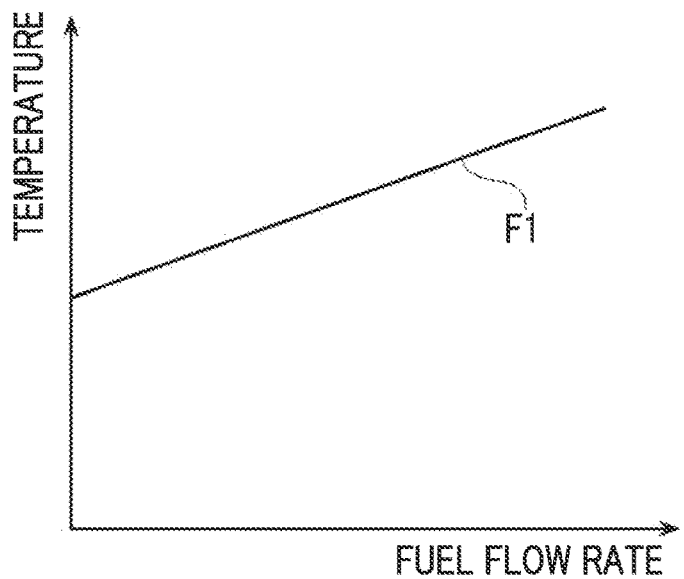
FIG. 3 is a graph showing the relationship between a fuel flow rate and a target temperature in the first embodiment according to the present disclosure.

The target temperature calculator 66 has a function F1 that indicates the relationship between a fuel flow rate indicated by the fuel flow rate command Fro and a target temperature of the warm water, as shown in FIG. 3. The function F1 indicates a relationship in which the target temperature increases as the fuel flow rate increases. The target temperature calculator 66 uses this function F1 to obtain the target temperature of the warm water with respect to the fuel flow rate indicated by the fuel flow rate command Fro.

The temperature deviation calculator 67 obtains a deviation ΔT between the target temperature and the temperature detected by the temperature sensor 48. Specifically, the temperature deviation calculator 67 subtracts the temperature detected by the temperature sensor 48 from the target temperature and outputs the obtained value as the temperature deviation ΔT. The PI controller 68 obtains an opening degree correction amount corresponding to the proportional/integral action corresponding to the temperature deviation ΔT, and outputs a valve command corresponding to the opening degree correction amount to the three-way valve 57.

The pressure control system 70 includes a pressure correction mode button 71, a lower limit value memory 72a, an upper limit value memory 72b, a lower limit deviation calculator 73a, an upper limit deviation calculator 73b, a lower limit deviation determiner 74a, an upper limit deviation determiner 74b, a lower limit correction indicator 75a, an upper limit correction indicator 75b, a lower limit correction value calculator 77a, an upper limit correction value calculator 77b, a first switcher 78a, a second switcher 78b, a first adder 79a, a second adder 79b, and the PI controller 68. The pressure control system 70 and the temperature control system 65 share the PI controller 68. The function or the like of each of the above elements of the pressure control system 70 will be described in the process of describing the operation of the pressure control system 70.

The control device 60 described above is a computer. The control device 60 includes, in terms of hardware, a CPU (central processing unit) that performs various arithmetic operations, a main storage device such as a memory that serves as a work area for the CPU, an auxiliary storage device such as a hard disk drive device, an input device such as a keyboard or a mouse, and a display device. Each of the functional units in the control device 60, such as the fuel flow rate calculation unit 61, the fuel valve control unit 62, the IGV control unit 63, the temperature control system 65, and the pressure control system 70, functions, for example, by executing a control program stored in an auxiliary storage device by the CPU.

Figure 4:
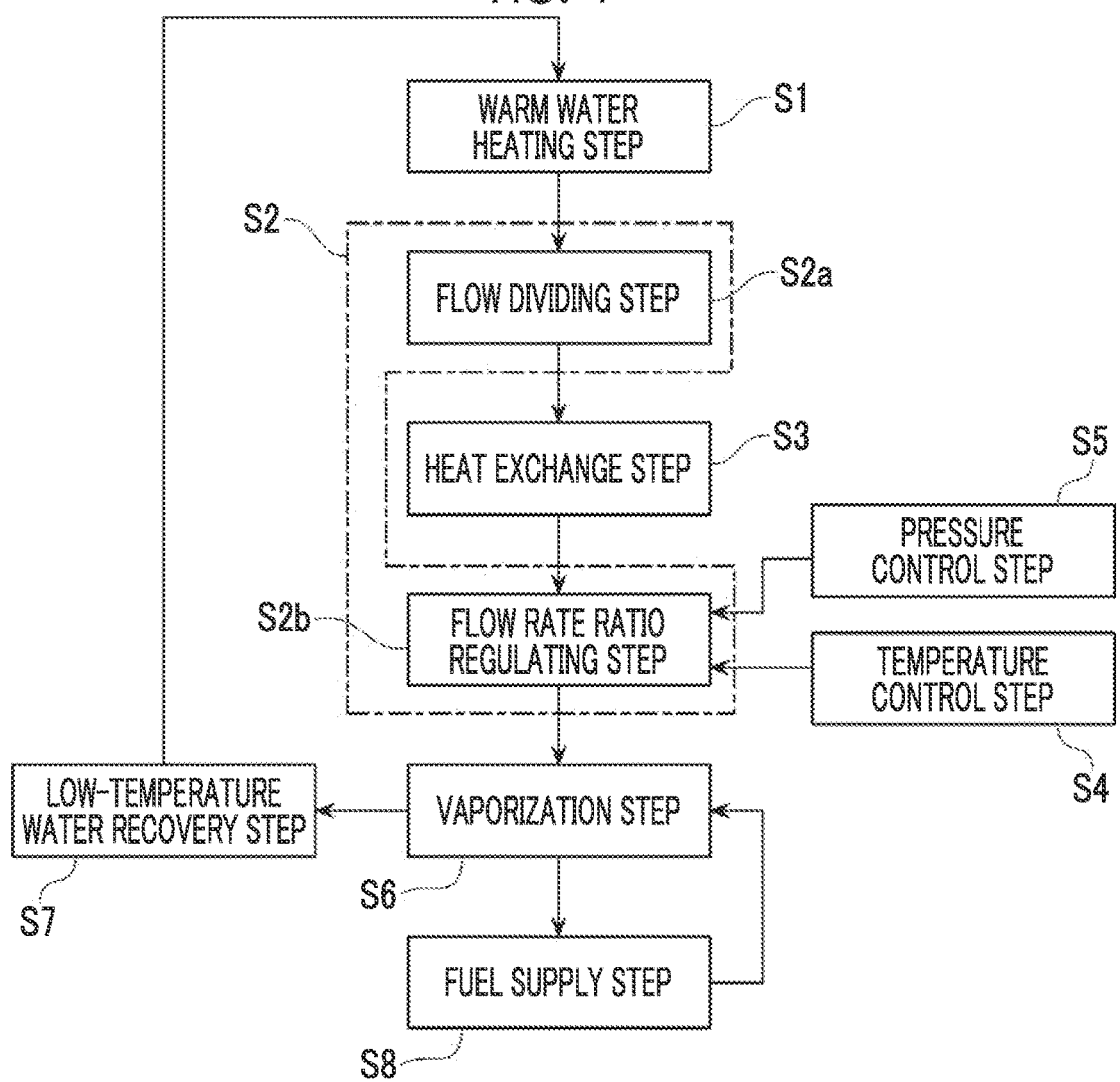
FIG. 4 is a flowchart showing procedures for a fuel supply method in the first embodiment according to the present disclosure.

Next, the method for supplying fuel to the gas turbine plant described above will be described according to the flowchart shown in FIG. 4.

In the fuel supply method of the present embodiment, a warm water heating step S1, a heat exchange amount regulating step S2, a heat exchange step S3, a temperature control step S4, a vaporization step S6, a low-temperature water recovery step S7, and a fuel supply step S8 are executed. Further, in this fuel supply method, a pressure control step S5 is also executed in response to a request from an operator.

In the warm water heating step S1, the warm water is heated by the heat exchange between the warm water in the warm water heater 52 disposed in the boiler casing 21c and the exhaust gas outside the warm water heater 52 in the boiler casing 21c. In the warm water heating step S1, for example, warm water of about 60° C. (low-temperature water) is heated to warm water of about 90° C. (high-temperature water). The high-temperature water flows from the warm water heater 52 into the main high-temperature water line 53x.

In the heat exchange amount regulating step S2, the heat exchange amount between the high-temperature water from the warm water heater 52 and the medium flowing into the heat exchanger 55 is regulated to regulate the temperature of the high-temperature water flowing into the vaporizer 45. The heat exchange amount regulating step S2 includes a flow dividing step S2a and a flow rate ratio regulating step S2b. In the flow dividing step S2a of the heat exchange amount regulating step S2, part of the high-temperature water flowing in through the main high-temperature water line 53x is allowed to flow to the branch high-temperature water line 53y, while the remaining high-temperature water is allowed to flow to the downstream side of the branch position of the branch high-temperature water line 53y in the main high-temperature water line 53x. That is, in the flow dividing step S2a, the high-temperature water flowing in through the main high-temperature water line 53x is divided into branch high-temperature water flowing through the branch high-temperature water line 53y and main high-temperature water flowing through the main high-temperature water line 53x. The flow rate ratio regulating step S2b of the heat exchange amount regulating step S2 will be described later.

In the heat exchange step S3, the branch high-temperature water and the medium flowing into the heat exchanger 55 are heat-exchanged in the heat exchanger 55 provided in the branch high-temperature water line 53y. Here, in a case where the medium flowing into the heat exchanger 55 is cooling water as described above, the temperature of the branch high-temperature water decreases.

In the temperature control step S4, the required output PWr for the gas turbine 10 is received, and the heat exchange amount in the heat exchange amount regulating step S2 is controlled according to the required output PWr. The temperature control system 65 of the control device 60 executes the temperature control step S4.

Here, the operation of the control device 60 will be described with reference to FIG. 2.

As described above, the fuel flow rate calculation unit 61 of the control device 60 receives the required output PWr for the gas turbine 10 from the outside. The fuel flow rate calculation unit 61 obtains a fuel flow rate corresponding to the required output PWr and outputs the fuel flow rate command Fro indicating the fuel flow rate. The flow rate here is a mass flow rate.

The fuel valve control unit 62 controls the degree of opening of the fuel regulating valve 43b such that the mass flow rate of the fuel passing through the fuel regulating valve 43b becomes the fuel flow rate indicated by the fuel flow rate command Fro. As a result, the mass flow rate of ammonia as fuel flowing into the combustor 15 from the gaseous ammonia line 46 becomes the fuel flow rate indicated by the fuel flow rate command Fro. The IGV control unit 63 controls the IGV opening degree such that the flow rate of the air flowing into the compressor casing 14c becomes the flow rate corresponding to the fuel flow rate indicated by the fuel flow rate command Fro.

As described above, the target temperature calculator 66 of the temperature control system 65 obtains the target temperature of the warm water with respect to the fuel flow rate indicated by the fuel flow rate command Fro, by using the function F1. The temperature deviation calculator 67 of the temperature control system 65 subtracts the temperature detected by the temperature sensor 48 from the target temperature and outputs the obtained value as the temperature deviation $\Delta T$.

The PI controller 68 of the temperature control system 65 obtains an opening degree correction amount corresponding to the proportional/integral action corresponding to the temperature deviation $\Delta T$, and outputs an operation amount corresponding to the opening degree correction amount to the three-way valve 57 as a valve command.

The heat exchange amount in the heat exchange amount regulating step S2 is regulated by controlling the operation of the three-way valve 57 via the operation of the temperature control system 65 described above.

As described above, the pressure control step S5 is executed in a case where the operator or the like desires pressure correction. The pressure control system 70 of the control device 60 executes the pressure control step S5.

The pressure correction mode button 71 of the pressure control system 70 accepts whether or not the operator or the like desires pressure correction. When the operator or the like desires pressure correction and presses the pressure correction mode button 71, the pressure correction mode button 71 outputs an ON signal, and the control device 60 enters a pressure correction mode.

A pressure lower limit value Pa of the fuel (gaseous ammonia) flowing into the combustor 15 is stored in the lower limit value memory 72a. A pressure upper limit value Pb of the fuel (gaseous ammonia) flowing into the combustor 15 is stored in the upper limit value memory 72b.

The lower limit deviation calculator 73a of the pressure control system 70 obtains a deviation $\Delta Pat$ between the pressure lower limit value Pa and the pressure detected by the pressure sensor 49. Specifically, the lower limit deviation calculator 73a subtracts the pressure detected by the pressure sensor 49 from the pressure lower limit value Pa, and outputs the obtained value as the lower limit deviation $\Delta Pat$. The upper limit deviation calculator 73b of the pressure control system 70 obtains a deviation $\Delta Pbt$ between the pressure upper limit value Pb and the pressure detected by the pressure sensor 49. Specifically, the upper limit deviation calculator 73b subtracts the pressure detected by the pressure sensor 49 from the pressure upper limit value Pb, and outputs the obtained value as the upper limit deviation $\Delta Pbt$.

The lower limit deviation determiner 74a of the pressure control system 70 determines whether or not the lower limit deviation $\Delta Pat$ is a positive value, in other words, whether or not the pressure detected by the pressure sensor 49 is smaller than the pressure lower limit value Pa, and outputs the effect. The upper limit deviation determiner 74b of the pressure control system 70 determines whether or not the upper limit deviation $\Delta Pbt$ is a negative value, in other words, whether or not the pressure detected by the pressure sensor 49 is greater than the pressure upper limit value Pb, and outputs the effect.

When the lower limit deviation $\Delta Pat$ is a positive value and the ON signal from the pressure correction mode button 71 is received, the lower limit correction indicator 75a of the pressure control system 70 outputs an ONa signal indicating that the temperature correction based on the pressure lower limit value Pa is to be executed. On the other hand, when the lower limit deviation $\Delta Pat$ is not a positive value or the ON signal from the pressure correction mode button 71 is not received, the lower limit correction indicator 75a outputs an OFFa signal indicating that the temperature correction based on the pressure lower limit value Pa is not to be executed. When the upper limit deviation $\Delta Pbt$ is a negative value and the ON signal from the pressure correction mode button 71 is received, the upper limit correction indicator 75b of the pressure control system 70 outputs an ONb signal indicating that the temperature correction based on the pressure upper limit value Pb is to be executed. On the other hand, when the upper limit deviation $\Delta Pbt$ is not a negative value or the ON signal from the pressure correction mode button 71 is not received, the upper limit correction indicator 75b outputs an OFFb signal indicating that the temperature correction based on the pressure upper limit value Pb is not to be executed.

The fuel flow rate command Fro and the lower limit deviation $\Delta Pat$ are input to the lower limit correction value calculator 77a of the pressure control system 70. The lower limit correction value calculator 77a obtains a lower limit correction value Ca corresponding to a fuel flow rate Fr indicated by the fuel flow rate command Fro and the lower limit deviation $\Delta Pat$ (>0) by using a function Fa shown below. The lower limit correction value Ca is a temperature correction value based on the pressure lower limit value Pa. Further, the lower limit correction value Ca is a positive value.

$$Fa: Ca = k \times \Delta Pat / Fr$$

In the above expression, k is a correction coefficient.

The fuel flow rate command Fro and the upper limit deviation $\Delta Pbt$ are input to the upper limit correction value calculator 77b of the pressure control system 70. The upper limit correction value calculator 77b obtains an upper limit correction value Cb corresponding to the fuel flow rate Fr indicated by the fuel flow rate command Fro and the upper limit deviation ΔPbt (<0) by using a function Fb shown below. The upper limit correction value Cb is a temperature correction value based on the pressure upper limit value Pb. Further, the upper limit correction value Cb is a negative value.

$$Fb: Cb = k \times \Delta Pbt / Fr$$

In the above expression, k is a correction coefficient.

When the first switcher 78a of the pressure control system 70 receives the ONa signal from the lower limit correction indicator 75a, the first switcher 78a outputs the lower limit correction value Ca obtained by the lower limit correction value calculator 77a. On the other hand, in a case where the first switcher 78a does not receive the ONa signal from the lower limit correction indicator 75a, the first switcher 78a outputs 0 as the lower limit correction value. When the second switcher 78b of the pressure control system 70 receives the ONb signal from the upper limit correction indicator 75b, the second switcher 78b outputs the upper limit correction value Cb obtained by the upper limit correction value calculator 77b. On the other hand, in a case where the second switcher 78b does not receive the ONb signal from the upper limit correction indicator 75b, the second switcher 78b outputs 0 as the upper limit correction value.

The first adder 79a of the pressure control system 70 adds the lower limit correction value Ca to the temperature deviation ΔT obtained by the temperature deviation calculator 67. The second adder 79b of the pressure control system 70 adds the upper limit correction value Cb to the temperature deviation ΔT obtained by the temperature deviation calculator 67.

The PI controller 68 of the pressure control system 70 obtains an opening degree correction amount corresponding to the proportional/integral action corresponding to (temperature deviation ΔT+lower limit correction value Ca) or (temperature deviation ΔT+upper limit correction value Cb), and outputs a valve command corresponding to this opening degree correction amount to the three-way valve 57.

The operation of the three-way valve 57 is controlled by the operation of the temperature control system 65 described above, so that the heat exchange amount in the heat exchange amount regulating step S2 is controlled such that the pressure of the gaseous ammonia flowing into the gas turbine 10 falls within a pressure range determined in advance.

The flow rate ratio regulating step S2b of the heat exchange amount regulating step S2 is executed by the three-way valve 57, which is the heat exchange amount regulator 56. The three-way valve 57 regulates the ratio between the flow rate of the main high-temperature water and the flow rate of the branch high-temperature water after the heat exchange in the heat exchange step S3 according to an instruction from the temperature control system 65, and causes the main high-temperature water and the branch high-temperature water after the heat exchange in the heat exchange step S3 to be merged with each other. As a result, the high-temperature water after the merging is regulated to a temperature sufficient to vaporize the liquid ammonia in the vaporizer 45. In the present embodiment, the boiling point of the liquid ammonia pressurized by the ammonia pump 44 is less than 60° C. Therefore, in the present embodiment, the temperature of the warm water flowing into the vaporizer 45 is regulated to a temperature in a range of about 90° C. to 60° C.

Further, even in a case where the three-way valve 57 receives an instruction from the pressure control system 70, the three-way valve 57 regulates the ratio between the flow rate of the main high-temperature water and the flow rate of the branch high-temperature water after the heat exchange in the heat exchange step S3 according to the instruction, and causes the main high-temperature water and the branch high-temperature water after the heat exchange in the heat exchange step S3 to be merged with each other. As a result, the high-temperature water after the merging is regulated to have a temperature sufficient to vaporize the liquid ammonia in the vaporizer 45 and such that the pressure of the gaseous ammonia flowing into the gas turbine 10 falls within a pressure range determined in advance.

In the vaporization step S6, the liquid ammonia is vaporized by the heat exchange between the warm water after the heat exchange amount with the medium has been regulated in the heat exchange amount regulating step S2 and the liquid ammonia, in the vaporizer 45.

In the low-temperature water recovery step S7, the warm water cooled by the heat exchange with liquid ammonia in the vaporizer 45 is returned to the warm water heater 52 through the low-temperature water line 51. The warm water returned to the warm water heater 52 is heated here by the exhaust gas. That is, the warm water heating step S1 described above is executed in the warm water heater 52.

In the fuel supply step S8, gaseous ammonia, which is ammonia vaporized by the vaporizer 45, is supplied to the combustor 15 of the gas turbine 10 through the gaseous ammonia line 46.

As described above, in the present embodiment, the warm water heated by the heat exchange between the warm water and the exhaust gas in the warm water heater 52 flows into the vaporizer 45 after being temperature-regulated. In the vaporizer 45, ammonia is vaporized by the heat exchange between the temperature-regulated warm water and the liquid ammonia. The temperature of the exhaust gas flowing through the heat recovery steam generator 21 changes according to a change in the operation situation of the gas turbine 10. Therefore, if the temperature of the exhaust gas changes, the temperature of the warm water heated by the warm water heater 52 also changes. However, in the present embodiment, as described above, the warm water heated by the warm water heater 52 flows into the vaporizer 45 after being temperature-regulated. Therefore, in the present embodiment, even if the temperature of the exhaust gas changes, all of the liquid ammonia that has flowed into the vaporizer 45 can be easily and reliably converted into gaseous ammonia.

Further, the amount of gaseous ammonia required by the gas turbine 10 also changes according to a change in the operation situation of the gas turbine 10. In the present embodiment, even if the amount of gaseous ammonia required by the gas turbine 10 changes, all of the liquid ammonia that has flowed into the vaporizer 45 can be easily and reliably converted into gaseous ammonia by changing the temperature of the warm water flowing into the vaporizer 45.

Therefore, in the present embodiment, even if the operation situation of the gas turbine 10 changes, the production amount of gaseous ammonia required by the gas turbine 10 can be easily and reliably obtained. Further, in the present embodiment, it is possible to enhance the responsiveness of the production amount of gaseous ammonia to a change in the operation situation of the gas turbine 10.

As described above, the flow rate of fuel that is supplied to the gas turbine 10 changes according to a change in the required output PWr of the gas turbine 10. In this case, the heat exchange amount between the fuel and the warm water in the vaporizer 45 changes with a change in fuel flow rate. If the temperature of the warm water is regulated according to the result of a change in heat exchange amount, it takes time from a change in the required output PWr until the production amount of gaseous ammonia is secured. In the present embodiment, since the operation amount of the heat exchange amount regulator 56 is determined according to the required output PWr, the time from a change in the required output PWr until the production amount of gaseous ammonia is secured can be shortened. Therefore, in the present embodiment, from the above point of view as well, it is possible to enhance the responsiveness of the production amount of gaseous ammonia to a change in the required output PWr.

If the pressure of the gaseous ammonia flowing into the gas turbine 10 is not within a pressure range determined in advance, the gaseous ammonia cannot be stably burned in the gas turbine 10. In the present embodiment, the pressure of gaseous ammonia flowing into the gas turbine 10 is controlled by the pressure control system 70 to fall within a pressure range determined in advance. Therefore, in the present embodiment, gaseous ammonia can be stably burned in the gas turbine 10.

Here, a case is considered where liquid ammonia flows into the heat transfer tube 45p of the vaporizer 45 and the warm water flows into the vaporizer casing 45c covering the heat transfer tube 45p. In this case, the liquid ammonia becomes gaseous ammonia inside the heat transfer tube 45p, and the gaseous ammonia stays in a part of the heat transfer tube 45p. Therefore, the effective heat transfer area for heat exchange between the liquid ammonia and the warm water becomes smaller than the total heat transfer area of the heat transfer tubes 45p. Moreover, in this case, the effective heat transfer area for heat exchange between the liquid ammonia and the warm water also changes with respect to a change in the production amount of gaseous ammonia. Therefore, in this case, it is difficult to control the heat exchange amount between the liquid ammonia and the warm water, and the required production amount of gaseous ammonia may not be secured.

On the other hand, in the present embodiment, the warm water flows into the heat transfer tube 45p of the vaporizer 45, and the liquid ammonia flows into the vaporizer casing 45c covering the heat transfer tube 45p. Therefore, in the present embodiment, the liquid ammonia in contact with an outer surface of the heat transfer tube 45p can be separated from the outer surface of the heat transfer tube 45p when vaporized. Therefore, in the present embodiment, the effective heat transfer area for the heat exchange between the liquid ammonia and the warm water can be made larger than that in the previous case with respect to the total heat transfer area of the heat transfer tube 45p. Moreover, in the present embodiment, the effective heat transfer area for the heat exchange between the liquid ammonia and the warm water does not substantially change with respect to a change in the production amount of gaseous ammonia. Therefore, in the present embodiment, from this point of view as well, it is easy to control the heat exchange amount between the liquid ammonia and the warm water, and the required production amount of gaseous ammonia can be easily and reliably obtained.

Inside the boiler casing 21c, the temperature of the exhaust gas decreases toward the downstream side of the flow of the exhaust gas. In the present embodiment, the warm water heater 52 is disposed on the downstream side with respect to the economizer 21eco, which is a heat transfer tube on the most downstream side among the plurality of heat transfer tubes, in the boiler casing 21c. Therefore, in the present embodiment, the heat of the exhaust gas whose temperature has become low can be effectively utilized in the warm water heater 52.

Second Embodiment

Next, a second embodiment of the gas turbine plant according to the present disclosure will be described using FIGS. 5 and 6.

Figure 5:
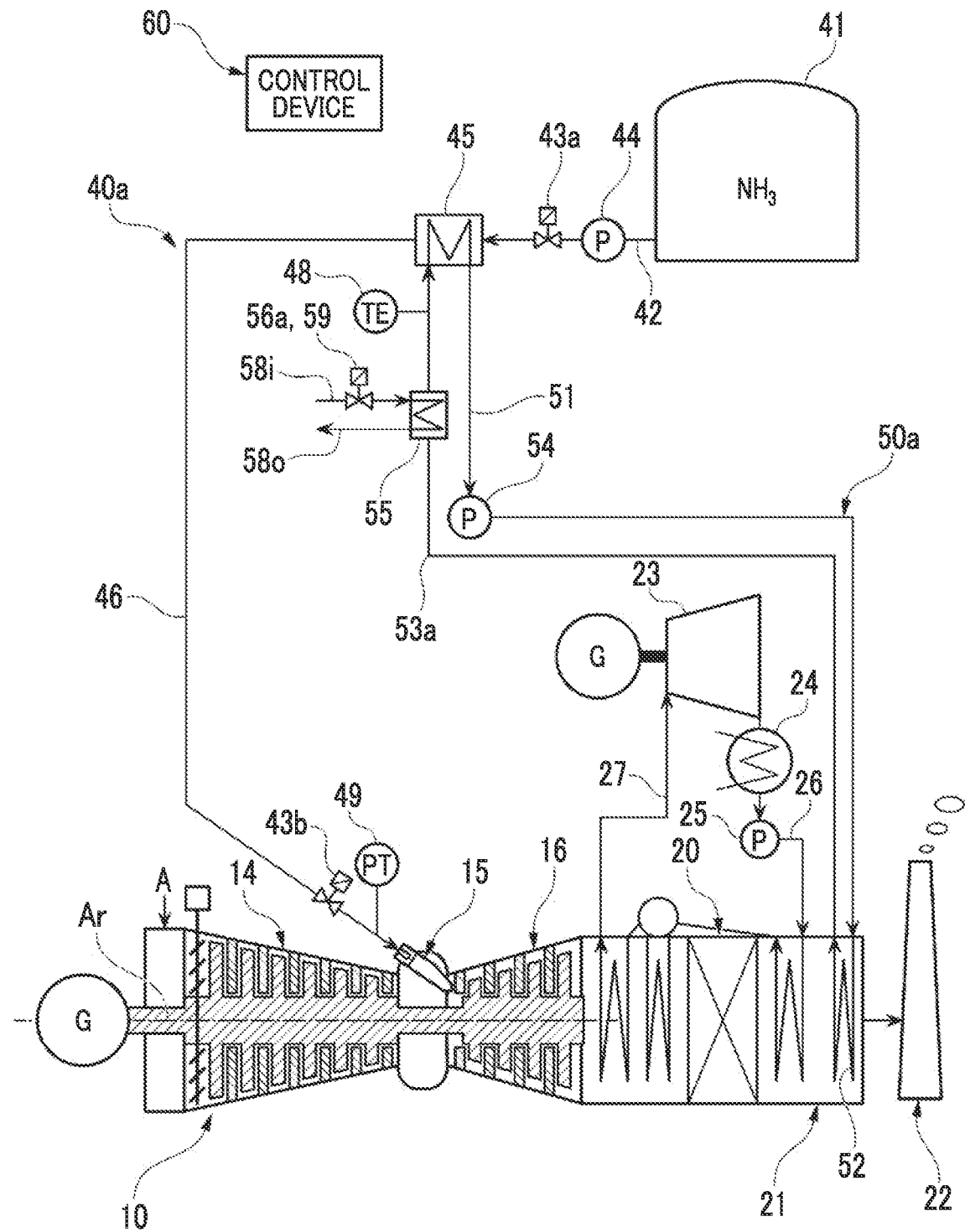
FIG. 5 is a system diagram of a gas turbine plant in a second embodiment according to the present disclosure.
Figure 6:
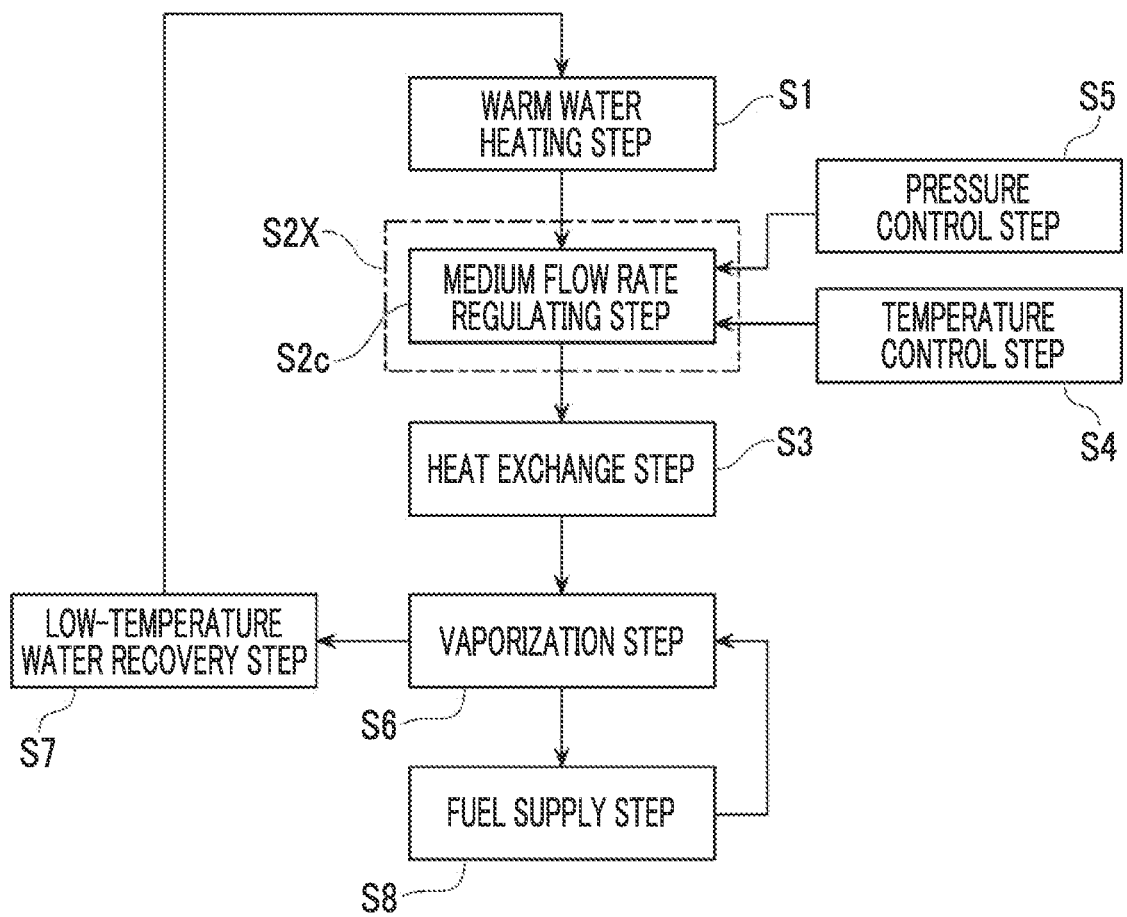
FIG. 6 is a flowchart showing procedures for a fuel supply method in the second embodiment according to the present disclosure.

As shown in FIG. 5, the gas turbine plant of the present embodiment also includes the gas turbine 10, the denitration device 20, the heat recovery steam generator 21, the chimney 22, the steam turbine 23, the condenser 24, the pump 25, and the control device 60, as in the gas turbine plant of the first embodiment. Further, the gas turbine plant of the present embodiment includes a fuel supply facility 40a different from the fuel supply facility 40 of the first embodiment.

As in the fuel supply facility 40 of the first embodiment, the fuel supply facility 40a of the present embodiment includes the ammonia tank 41, the liquid ammonia line 42, the liquid ammonia regulating valve 43a, the fuel regulating valve 43b, the ammonia pump 44, the vaporizer 45, the gaseous ammonia line 46, the warm water pump 54, the heat exchanger 55, the medium line 58i, the medium recovery line 58o, and the medium flow rate regulator 59. Further, the fuel supply facility 40a of the present embodiment includes a warm water line 50a different from the warm water line 50 of the first embodiment, and a heat exchange amount regulator 56a different from the heat exchange amount regulator 56 of the first embodiment.

The warm water line 50a of the present embodiment has the low-temperature water line 51 and the warm water heater 52, as in the warm water line 50 of the first embodiment. Further, the warm water line 50a of the present embodiment has a high-temperature water line 53a different from the high-temperature water line 53 of the first embodiment. Although the high-temperature water line 53 of the first embodiment has the branch high-temperature water line 53y, the high-temperature water line 53a of the present embodiment does not have the branch high-temperature water line 53y.

The heat exchanger 55 of the present embodiment is provided in the high-temperature water line 53a. Therefore, all of the high-temperature water from the warm water heater 52 flows into the heat exchanger 55 through the high-temperature water line 53a. The medium flow rate regulator 59 is provided in the medium line 58i connected to the heat exchanger 55, as in the first embodiment. The heat exchange amount regulator 56a of the present embodiment has the medium flow rate regulator 59.

The control device 60 of the present embodiment controls the operation of the medium flow rate regulator 59 when regulating the temperature of the warm water.

Next, a method for supplying fuel to the gas turbine plant according to the present embodiment will be described according to the flowchart shown in FIG. 6.

In the fuel supply method of the present embodiment, as in the fuel supply method of the first embodiment, the warm water heating step S1, the heat exchange step S3, the pressure control step S5, the temperature control step S4, the vaporization step S6, the low-temperature water recovery step S7, and the fuel supply step S8 are executed. Further, also in the fuel supply method of the present embodiment, the pressure control step S5 is also executed in response to a request from the operator, as in the fuel supply method of the first embodiment. Further, in the fuel supply method of the present embodiment, a heat exchange amount regulating step S2X different from the heat exchange amount regulating step S2 of the first embodiment is executed.

Also in the heat exchange amount regulating step S2X of the present embodiment, as in the heat exchange amount regulating step S2 of the first embodiment, the temperature of the high-temperature water flowing into the vaporizer 45 is regulated by regulating the heat exchange amount between the high-temperature water from the warm water heater 52 and the medium flowing into the heat exchanger 55. However, the heat exchange amount regulating method in the heat exchange amount regulating step S2X of the present embodiment is different from the heat exchange amount regulating method in the heat exchange amount regulating step S2 of the first embodiment. The heat exchange amount regulating step S2X of the present embodiment includes a medium flow rate regulating step S2c.

In the medium flow rate regulating step S2c, the medium flow rate regulator 59 as the heat exchange amount regulator 56a operates based on an instruction from the temperature control system 65 or the pressure control system 70 of the control device 60. As a result, the flow rate of the medium flowing into the heat exchanger 55 is regulated. As a result, the heat exchange amount between the medium and the high-temperature water in the heat exchanger 55 is regulated, and the temperature of the high-temperature water flowing into the vaporizer 45 is regulated.

The PI controller 68 of the temperature control system 65 in the present embodiment obtains an opening degree correction amount corresponding to the proportional/integral action corresponding to the temperature deviation ΔT, and outputs an operation amount corresponding to the opening degree correction amount to the medium flow rate regulator 59. Further, the PI controller 68 of the pressure control system 70 in the present embodiment obtains the opening degree correction amount corresponding to the proportional/integral action corresponding to (temperature deviation ΔT+lower limit correction value Ca) or (temperature deviation ΔT+upper limit correction value Cb), and outputs an operation amount corresponding to the opening degree correction amount to the medium flow rate regulator 59.

In this manner, the operation of the medium flow rate regulator 59 is controlled by the operation of the temperature control system 65 or the pressure control system 70, so that the heat exchange amount in the heat exchange amount regulating step S2X is controlled.

As described above, also in the present embodiment, the warm water heated by the warm water heater 52 flows into the vaporizer 45 after being temperature-regulated, and therefore, even if the operation situation of the gas turbine 10 changes, the production amount of gaseous ammonia required by the gas turbine 10 can be easily obtained. Further, in the present embodiment, it is possible to enhance the responsiveness of the production amount of gaseous ammonia to a change in the operation situation of the gas turbine 10.

Further, since the high-temperature water line 53a of the present embodiment does not have the branch high-temperature water line 53y, the line configuration becomes simpler than that of the gas turbine plant of the first embodiment, and equipment costs can be reduced.

The heat exchange amount regulator 56 of the first embodiment may have the medium flow rate regulator 59, as in the present embodiment, in addition to the three-way valve 57.

"Modification Example of Control Device"

Figure 7:
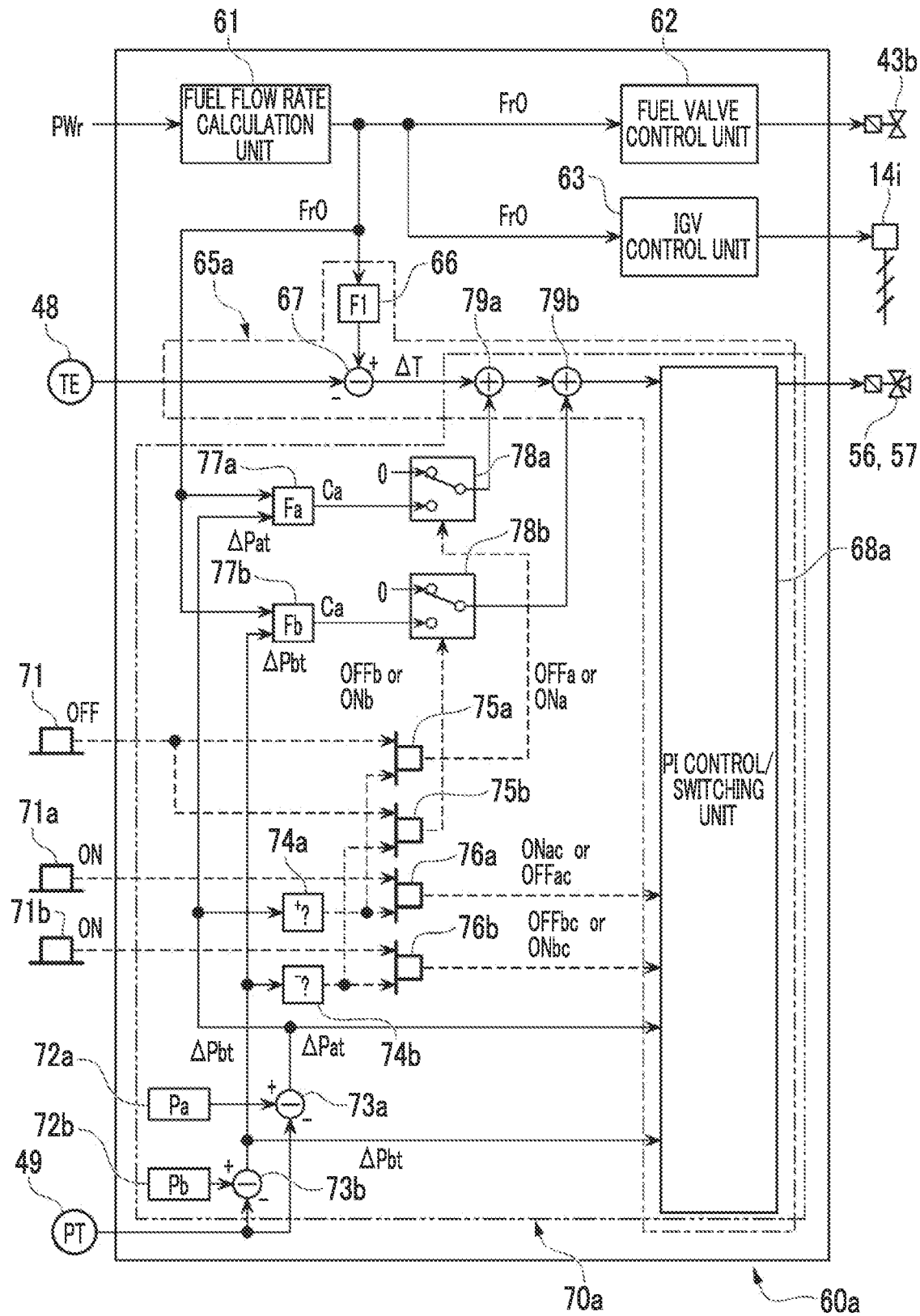
FIG. 7 is a functional block diagram of a control device in a modification example according to the present disclosure.

Next, a modification example of the control device described above will be described using FIG. 7. In the control device 60 of each of the embodiments described above, a pressure correction mode can be set. In a control device 60a of the present modification example, in addition to the pressure correction mode, a pressure lower limit value control mode and a pressure upper limit value control mode can also be set.

The control device 60a of the present modification example includes the fuel flow rate calculation unit 61, the fuel valve control unit 62, and the IGV control unit 63, as in the control device 60 of each of the embodiments described above. Further, the control device 60a of the present modification example includes a temperature control system 65a different from the temperature control system 65 of each of the embodiments described above, and a pressure control system 70a different from the pressure control system 70 of each of the embodiments described above.

The temperature control system 65a of the present modification example includes the target temperature calculator 66 and the temperature deviation calculator 67, as in the temperature control system 65 of each of the embodiments described above. Further, the temperature control system 65a of the present modification example includes a PI control/switching unit 68a having the same function as the PI controller 68 of each of the embodiments described above.

The temperature control system 65a of the present modification example obtains an opening degree correction amount corresponding to the proportional/integral action corresponding to the deviation temperature ΔT between the target temperature and the temperature detected by the temperature sensor 48, and outputs an operation amount corresponding to the opening degree correction amount to the three-way valve 57 or the medium flow rate regulator 59 as the heat exchange amount regulator 56 or 56a, as in the temperature control system 65 of each of the embodiments described above.

The pressure control system 70a of the present modification example includes the pressure correction mode button 71, the lower limit value memory 72a, the upper limit value memory 72b, the lower limit deviation calculator 73a, the upper limit deviation calculator 73b, the lower limit deviation determiner 74a, the upper limit deviation determiner 74b, the lower limit correction indicator 75a, the upper limit correction indicator 75b, the lower limit correction value calculator 77a, the upper limit correction value calculator 77b, the first switcher 78a, the second switcher 78b, the first adder 79a, and the second adder 79b, as in the pressure control system 70 of each of the embodiments described above. The pressure control system 70a of the present modification example further includes the PI control/switching unit 68a. The pressure control system 70a and the temperature control system 65a share the PI control/switching unit 68a.

The pressure control system 70a of the present modification example further includes a lower limit control mode button 71a, an upper limit control mode button 71b, a lower limit control indicator 76a, and an upper limit control indicator 76b.

The lower limit control mode button 71a accepts whether or not the operator or the like desires pressure lower limit value control. When the operator or the like desires pressure lower limit value control and presses the lower limit control mode button 71a, the lower limit control mode button 71a outputs an ON signal, and the control device 60a enters a pressure lower limit value control mode. The upper limit control mode button 71b accepts whether or not the operator or the like desires pressure upper limit value control. When the operator or the like desires pressure upper limit value control and presses the upper limit control mode button 71b, the upper limit control mode button 71b outputs an ON signal, and the control device 60a enters a pressure upper limit value control mode.

When the lower limit deviation ΔPat obtained by the lower limit deviation calculator 73a is a positive value and an ON signal from the lower limit control mode button 71a is received, the lower limit control indicator 76a outputs an ONac signal indicating that temperature control based on the pressure lower limit value Pa is to be executed. On the other hand, in a case where the lower limit deviation ΔPat is not a positive value or an ON signal from the lower limit control mode button 71a is not received, the lower limit control indicator 76a outputs an OFFac signal indicating that temperature control based on the pressure lower limit value Pa is not to be executed. When the upper limit deviation ΔPbt obtained by the upper limit deviation calculator 73b is a negative value and an ON signal from the upper limit control mode button 71b is received, the upper limit control indicator 76b outputs an ONbc signal indicating that temperature control based on the pressure upper limit value Pb is to be executed. On the other hand, in a case where the upper limit deviation ΔPbt is not a negative value or an ON signal from the upper limit control mode button 71b is not received, the upper limit control indicator 76b outputs an OFFbc signal indicating that temperature control based on the pressure upper limit value Pb is not to be executed.

When the PI control/switching unit 68a receives the ONac signal from the lower limit control indicator 76a, the PI control/switching unit 68a obtains an operation amount based on the lower limit deviation ΔPat obtained by the lower limit deviation calculator 73a, and outputs the operation amount to the three-way valve 57 or the medium flow rate regulator 59 as the heat exchange amount regulator 56 or 56a. The operation amount of the three-way valve 57 or the medium flow rate regulator 59 at this time is different from the operation amount in a case where temperature correction based on the pressure lower limit value Pa is performed in the pressure correction mode. Therefore, the operation amount of the three-way valve 57 or the medium flow rate regulator 59 changes according to whether the operator or the like selects the pressure correction mode or selects the pressure lower limit value control mode.

Further, when the PI control/switching unit 68a receives the ONbc signal from the upper limit control indicator 76b, the PI control/switching unit 68a obtains an operation amount based on the upper limit deviation ΔPbt obtained by the upper limit deviation calculator 73b, and outputs the operation amount to the three-way valve 57 or the medium flow rate regulator 59 as the heat exchange amount regulator 56 or 56a. The operation amount of the three-way valve 57 or the medium flow rate regulator 59 at this time is different from the operation amount in a case where temperature correction based on the pressure upper limit value Pb is performed in the pressure correction mode. Therefore, the operation amount of the three-way valve 57 or the medium flow rate regulator 59 changes according to whether the operator or the like selects the pressure correction mode or selects the pressure condition value control mode.

The buttons of the control device 60 in each of the above-described embodiments and the control device 60a of the present modification example may be buttons that physically exist, or buttons that exist virtually on a display or the like.

Other Modification Examples

In the above, cooling water is exemplified as a medium that is an object of heat exchange with warm water. However, mediums other than the cooling water may be used as long as there is a temperature difference of a certain value or more from the temperature of the warm water.

In each of the embodiments and the modification example described above, after the warm water is heated to about 90° C. by the warm water heater 52, the warm water is cooled to a warm water temperature in a range of 90° C. to 60° C. by the heat exchange between the warm water and the medium such as cooling water. However, the heated warm water may be further heated by the warm water heater 52 to regulate the temperature of the warm water. In this case, in the warm water heater 52, the warm water is heated to about 50° C., for example. Then, the heated warm water is further heated to a warm water temperature in a range of 90° C. to 60° C. by the heat exchange between the warm water and the medium having a temperature in a range of about 100° C. to 70° C., for example.

In each of the embodiments and the modification example described above, the warm water heater 52 is disposed on the downstream side with respect to the economizer 21eco, which is a heat transfer tube on the most downstream side among the plurality of heat transfer tubes, in the boiler casing 21c. However, the warm water heater 52 may be disposed at a position overlapping the heat transfer tube on the most downstream side in the flow direction of the exhaust gas in the boiler casing 21c.

The gas turbines 10 of each of the embodiments and the modification example described above are so-called single-shaft gas turbines. However, the gas turbine may also be a twin-shaft gas turbine. That is, the gas turbine may have a compressor, a combustor, a high-pressure turbine, and a low-pressure turbine. In this case, a compressor rotor and a high-pressure turbine rotor are connected to each other to form a first gas turbine rotor. Further, a low-pressure turbine rotor forms a second gas turbine rotor and is not mechanically connected to the first gas turbine rotor.

The gas turbine plants of each of the embodiments and the modification example described above are combined cycle plants each including the gas turbine 10, the heat recovery steam generator 21, and the steam turbine 23. However, the gas turbine plant may be a cogeneration plant that includes the gas turbine 10 and the heat recovery steam generator 21 and that does not include the steam turbine. In this case, the steam generated by the heat recovery steam generator 21 is utilized within the factory, for example.

The gas turbine plants of each of the embodiments and the modification example described above include the denitration device 20. However, in a case where the NOx concentration in the exhaust gas discharged from the gas turbine 10 satisfies the environmental standard, the gas turbine plant may be a plant that does not have a denitration device.

The embodiments and modification examples of the present disclosure have been described in detail above. However, the present disclosure is not limited to the above embodiments and modification examples. Various additions, changes, replacements, partial deletions, and the like are possible within a scope which does not depart from the conceptual idea and gist of the present invention which are derived from the content defined in the claims and equivalents thereof.

"Additional Remarks"

The gas turbine plants in the above embodiments are understood as follows, for example.

(1) A gas turbine plant in a first aspect includes the gas turbine 10 that burns fuel and is capable of being driven by a combustion gas generated by combustion of the fuel, the heat recovery steam generator 21 capable of generating steam by utilizing heat of an exhaust gas from the gas turbine 10, and the fuel supply facility 40 or 40a capable of supplying ammonia as the fuel to the gas turbine 10. The fuel supply facility 40 or 40a includes the liquid ammonia line 42 connected to the ammonia tank 41 capable of storing liquid ammonia, the warm water line 50 or 50a through which warm water can flow, the vaporizer 45 connected to an end of the liquid ammonia line 42 and capable of heating and vaporizing the liquid ammonia via the heat exchange between the warm water from the warm water line 50 or 50a and the liquid ammonia, the heat exchanger 55 capable of performing heat exchange between the warm water in the warm water line 50 or 50a and a medium, the heat exchange amount regulator 56 or 56a capable of regulating a heat exchange amount between the warm water and the medium to adjust a temperature of the warm water flowing into the vaporizer 45, and the gaseous ammonia line 46 capable of leading gaseous ammonia, which is ammonia vaporized in the vaporizer 45, to the gas turbine 10. The vaporizer 45 has the ammonia inlet 45ci, the ammonia outlet 45co, the warm water inlet 45pi, and the warm water outlet 45po. The liquid ammonia line 42 is connected to the ammonia inlet 45ci of the vaporizer 45. The gaseous ammonia line 46 is connected to the ammonia outlet 45co of the vaporizer 45. The warm water line 50 or 50a has the warm water heater 52 that is disposed in the heat recovery steam generator 21 and that heats the warm water via the heat exchange between the warm water and the exhaust gas, and the high-temperature water line 53 or 53a that connects the warm water heater 52 and the warm water inlet 45pi of the vaporizer 45. The heat exchanger 55 is provided in the high-temperature water line 53 or 53a.

In this aspect, the warm water heated by the heat exchange between the warm water and the exhaust gas in the warm water heater 52 flows into the vaporizer 45 after being temperature-regulated. In the vaporizer 45, ammonia is vaporized by the heat exchange between the temperature-regulated warm water and the liquid ammonia. The temperature of the exhaust gas flowing through the heat recovery steam generator 21 changes according to a change in the operation situation of the gas turbine 10. Therefore, if the temperature of the exhaust gas changes, the temperature of the warm water heated by the warm water heater 52 also changes. However, in this aspect, as described above, the warm water heated by the warm water heater 52 flows into the vaporizer 45 after being temperature-regulated. Therefore, in this aspect, even if the temperature of the exhaust gas changes, all of the liquid ammonia that has flowed into the vaporizer 45 can be easily converted into gaseous ammonia.

Further, the amount of gaseous ammonia required by the gas turbine 10 also changes according to a change in the operation situation of the gas turbine 10. In this aspect, even if the amount of gaseous ammonia required by the gas turbine 10 changes, all of the liquid ammonia flowing into the vaporizer 45 can be easily converted into gaseous ammonia by changing the temperature of the warm water flowing into the vaporizer 45.

Therefore, in this aspect, even if the operation situation of the gas turbine 10 changes, the production amount of gaseous ammonia required by the gas turbine 10 can be easily obtained. Further, in this aspect, it is possible to enhance the responsiveness of the production amount of gaseous ammonia to a change in the operation situation of the gas turbine 10.

(2) In a gas turbine plant in a second aspect, in the gas turbine plant in the first aspect, the high-temperature water line 53 has the main high-temperature water line 53x that connects the warm water inlet 45pi of the vaporizer 45 and the warm water heater 52, and the branch high-temperature water line 53y branched from the main high-temperature water line 53x and then connected to the main high-temperature water line 53x. The heat exchanger 55 is provided in the branch high-temperature water line 53y. The heat exchange amount regulator 56 has a flow rate ratio regulator that regulates the ratio between the flow rate of the warm water flowing between the branch position of the branch high-temperature water line 53y and the connection position of the branch high-temperature water line 53y and the flow rate of the warm water flowing through the branch high-temperature water line 53y, in the main high-temperature water line 53x.

In this aspect, the heat exchange amount between the warm water and the medium can be regulated by regulating the ratio between the flow rate of the warm water flowing between the branch position of the branch high-temperature water line 53y and the connection position of the branch high-temperature water line 53y and the flow rate of the warm water flowing through the branch high-temperature water line 53y, in the main high-temperature water line 53x.

(3) In a gas turbine plant in a third aspect, in the gas turbine plant in the first or second aspect, the heat exchange amount regulator 56a has the medium flow rate regulator 59 that regulates the flow rate of the medium flowing into the heat exchanger 55.

In this aspect, the heat exchange amount between the warm water and the medium can be regulated by regulating the flow rate of the medium flowing into the heat exchanger 55.

(4) In a gas turbine plant in a fourth aspect, in the gas turbine plant in any one of the first to third aspects, the vaporizer 45 has the heat transfer tube 45p that has the warm water inlet 45pi and the warm water outlet 45po and through which the warm water can flow, and the vaporizer casing 45c that covers the heat transfer tube 45p and is capable of temporarily storing the liquid ammonia. The vaporizer casing 45c has the ammonia inlet 45ci and the ammonia outlet 45co. The liquid ammonia line 42 is connected to the ammonia inlet 45ci of the vaporizer casing 45c, and the gaseous ammonia line 46 is connected to the ammonia outlet 45co of the vaporizer casing 45c.

In a case where the liquid ammonia flows into the heat transfer tube 45p and the warm water flows into the vaporizer casing 45c covering the heat transfer tube 45p, the liquid ammonia becomes gaseous ammonia in the heat transfer tube 45p, and the gaseous ammonia stays in a part of the heat transfer tube 45p. Therefore, the effective heat transfer area for heat exchange between the liquid ammonia and the warm water becomes smaller than the total heat transfer area of the heat transfer tubes 45p. Moreover, in this case, the effective heat transfer area for heat exchange between the liquid ammonia and the warm water also changes with respect to a change in the production amount of gaseous ammonia. Therefore, in this case, it is difficult to control the heat exchange amount between the liquid ammonia and the warm water, and the required production amount of gaseous ammonia may not be secured.

On the other hand, in this aspect, the warm water flows into the heat transfer tubes 45p, and the liquid ammonia flows into the vaporizer casing 45c covering the heat transfer tubes 45p. Therefore, in this aspect, the liquid ammonia in contact with the outer surface of the heat transfer tube 45p can be separated from the outer surface of the heat transfer tube 45p when vaporized. Therefore, in this aspect, the effective heat transfer area for heat exchange between the liquid ammonia and the warm water can be made larger than in the previous case with respect to the total heat transfer area of the heat transfer tubes 45p. Moreover, in this aspect, the effective heat transfer area for heat exchange between the liquid ammonia and the warm water does not substantially change with respect to a change in the production amount of gaseous ammonia. Therefore, in this aspect, it is easy to control the heat exchange amount between the liquid ammonia and the warm water, and the required production amount of gaseous ammonia can be easily obtained.

(5) In a gas turbine plant in a fifth aspect,
in the gas turbine plant in any one of the first to fourth aspects, the heat recovery steam generator 21 has the boiler casing 21c through which the exhaust gas from the gas turbine 10 flows, and a plurality of heat transfer tubes that are disposed in the boiler casing 21c and through which water or steam flows. The plurality of heat transfer tubes are arranged in a flow direction of the exhaust gas within the boiler casing 21c. The warm water heater 52 is disposed, in the boiler casing 21c, at a position overlapping the heat transfer tube on the most downstream side in the flow direction of the exhaust gas among the plurality of heat transfer tubes, in the flow direction of the exhaust gas, or at a position on the further downstream side.

Inside the boiler casing 21c, the temperature of the exhaust gas decreases toward the downstream side of the flow of the exhaust gas. In this aspect, the heat of the exhaust gas whose temperature has become low can be effectively utilized by the warm water heater 52.

(6) In a gas turbine plant in a sixth aspect,
the gas turbine plant in any one of the first to fifth aspects further includes the control device 60 or 60a that controls an operation of the heat exchange amount regulator 56 or 56a. The control device 60 or 60a includes the temperature control system 65 or 65a that determines an operation amount of the heat exchange amount regulator 56 or 56a according to the required output PWr for the gas turbine 10 from the outside and that instructs the heat exchange amount regulator 56 or 56a on the operation amount.

The flow rate of the fuel that is supplied to the gas turbine 10 changes according to a change in the required output PWr for the gas turbine 10. In this case, the heat exchange amount between the fuel and the warm water in the vaporizer 45 changes with a change in fuel flow rate. If the temperature of the warm water is regulated according to the result of a change in heat exchange amount, it takes time from a change in the required output PWr until the production amount of gaseous ammonia is secured. In this aspect, since the operation amount of the heat exchange amount regulator 56 or 56a is determined according to the required output PWr, the time from a change in the required output PWr until the production amount of gaseous ammonia is secured can be shortened. In other words, in this aspect, it is possible to enhance the responsiveness of the production amount of gaseous ammonia to a change in the required output PWr.

(7) In a gas turbine plant in a seventh aspect,
in the gas turbine plant in the sixth aspect, the control device 60 or 60a further includes the pressure control system 70 or 70a that determines the operation amount of the heat exchange amount regulator 56 or 56a such that the pressure of the gaseous ammonia flowing into the gas turbine 10 falls within a pressure range determined in advance, and that instructs the heat exchange amount regulator 56 or 56a on the operation amount.

If the pressure of the gaseous ammonia flowing into the gas turbine 10 is not within a pressure range determined in advance, the gaseous ammonia cannot be stably burned in the gas turbine 10. In this aspect, the pressure of the gaseous ammonia flowing into the gas turbine 10 is controlled by the pressure control system 70 or 70a such that the pressure of the gaseous ammonia falls within a pressure range determined in advance. Therefore, in this aspect, the gaseous ammonia can be stably burned within the gas turbine 10.

The method for supplying fuel to a gas turbine plant in each of the embodiments and each of the modification examples described above is understood as follows, for example.

(8) A method for supplying fuel to a gas turbine plant in an eighth aspect is
a method for supplying fuel to a gas turbine plant that includes the gas turbine 10 that burns fuel and is capable of being driven by a combustion gas generated by combustion of the fuel, and the heat recovery steam generator 21 capable of generating steam by utilizing heat of an exhaust gas from the gas turbine 10, the method including: a warm water heating step S1 of performing heat exchange between warm water in a warm water heater 52 disposed in the heat recovery steam generator 21 and the exhaust gas outside the warm water heater 52 in the heat recovery steam generator 21 to heat the warm water; a heat exchange step S3 of performing heat exchange between the warm water heated in the warm water heating step S1 and a medium; a heat exchange amount regulating step S2 or S2X of regulating a heat exchange amount between the warm water heated in the warm water heating step S1 and the medium; a vaporization step S6 of performing heat exchange between the warm water after the heat exchange amount with the medium has been regulated in the heat exchange amount regulating step S2 or S2X and liquid ammonia from the ammonia tank 41 storing the liquid ammonia to vaporize the liquid ammonia in the vaporizer 45; and a fuel supply step S8 of supplying gaseous ammonia, which is ammonia vaporized in the vaporization step S6, to the gas turbine 10 as fuel. In the heat exchange amount regulating step S2 or S2X, a temperature of the warm water flowing into the vaporizer 45 is regulated by regulating the heat exchange amount between the warm water and the medium in the heat exchange step S3.

In this aspect, as in the gas turbine plant in the first aspect, even if the operation situation of the gas turbine 10 changes, the production amount of gaseous ammonia required by the gas turbine 10 can be easily obtained. Further, also in this aspect, it is possible to enhance the responsiveness of the production amount of gaseous ammonia to a change in the operation situation of the gas turbine 10.

(9) In a method for supplying fuel to a gas turbine plant in a ninth aspect,
in the method for supplying fuel to a gas turbine plant in the eighth aspect, the heat exchange amount regulating step S2 includes a flow dividing step S2a of dividing the warm water heated in the warm water heating step S1 into main high-temperature water and branch high-temperature water, and a flow rate ratio regulating step S2b. In the heat exchange step S3, heat exchange between the branch high-temperature water and the medium is performed. In the flow rate ratio regulating step S2b, the ratio between the flow rate of the main high-temperature water and the flow rate of the branch high-temperature water after the heat exchange in the heat exchange step S3 is regulated, and the main high-temperature water and the branch high-temperature water after the heat exchange in the heat exchange step S3 are merged with each other.

In this aspect, as in the gas turbine plant in the second aspect, the heat exchange amount between the warm water and the medium can be regulated.

(10) In a method for supplying fuel to a gas turbine plant in a tenth aspect,
in the method for supplying fuel to a gas turbine plant in the eighth or ninth aspect, the heat exchange amount regulating step S2X includes a medium flow rate regulating step S2c of regulating the flow rate of the medium that heat-exchanges with the warm water in the heat exchange step S3.

In this aspect, as in the gas turbine plant in the third aspect, the heat exchange amount between the warm water and the medium can be regulated.

(11) In a method for supplying fuel to a gas turbine plant in an eleventh aspect,
the method for supplying fuel to a gas turbine plant in any one of the eighth to tenth aspects further includes a temperature control step S4 of controlling the regulation of the heat exchange amount in the heat exchange amount regulating step S2 or S2X according to the required output PWr for the gas turbine 10 from the outside.

In this aspect, as in the gas turbine plant in the sixth aspect, it is possible to enhance the responsiveness of the production amount of gaseous ammonia to a change in the required output PWr.

(12) In a method for supplying fuel to a gas turbine plant in a twelfth aspect,
the method for supplying fuel to a gas turbine plant in the eleventh aspect further includes a pressure control step S5 of controlling the regulation of the heat exchange amount in the heat exchange amount regulating step S2 or S2X such that the pressure of the gaseous ammonia flowing into the gas turbine 10 falls within a pressure range determined in advance.

In this aspect, as in the gas turbine plant in the seventh aspect, gaseous ammonia can be stably burned in the gas turbine 10.

INDUSTRIAL APPLICABILITY

According to an aspect of the present disclosure, it is possible to easily obtain the production amount of gaseous ammonia that is required by a gas turbine.

REFERENCE SIGNS LIST

10: gas turbine
11: gas turbine rotor
12: intermediate casing
14: compressor
14r: compressor rotor
14c: compressor casing
14i: intake air amount regulator (or IGV)
15: combustor
16: turbine
16r: turbine rotor
16c: turbine casing
20: denitration device
21: heat recovery steam generator
21c: boiler casing
21eco: economizer
21eva: evaporator
21s: superheater
22: chimney
23: steam turbine
24: condenser
25: pump
26: water supply line
27: main steam line
40, 40a: fuel supply facility
41: ammonia tank
42: liquid ammonia line
43a: liquid ammonia regulating valve
43b: fuel regulating valve
44: ammonia pump
45: vaporizer
45c: vaporizer casing
45ci: ammonia inlet
45co: ammonia outlet
45p: heat transfer tube
45pi: warm water inlet
45po: warm water outlet
46: gaseous ammonia line
48: temperature sensor
49: pressure sensor
50, 50a: warm water line
51: low-temperature water line
52: warm water heater
53, 53a: high-temperature water line
53x: main high-temperature water line
53y: branch high-temperature water line
54: warm water pump
55: heat exchanger
55c: heat exchanger casing
55p: heat transfer tube
55pi: medium inlet
55po: medium outlet
56, 56a: heat exchange amount regulator
57: three-way valve (or flow rate ratio regulator)
58i: medium line
58o: medium recovery line
59: medium flow rate regulator
60, 60a: control device
61: fuel flow rate calculation unit
62: fuel valve control unit
63: IGV control unit
65, 65a: temperature control system
66: target temperature calculator
67: temperature deviation calculator
68: PI controller
68a: PI control/switching unit
70, 70a: pressure control system
71: pressure correction mode button
71a: lower limit control mode button
71b: upper limit control mode button 72a: lower limit value memory
72b: upper limit value memory
73a: lower limit deviation calculator
73b: upper limit deviation calculator
74a: lower limit deviation determiner
74b: upper limit deviation determiner
75a: lower limit correction indicator
75b: upper limit correction indicator
76a: lower limit control indicator
76b: upper limit control indicator
77a: lower limit correction value calculator
77b: upper limit correction value calculator
78a: first switcher
78b: second switcher
79a: first adder
79b: second adder

The invention claimed is:

1. A gas turbine plant comprising:
a gas turbine that burns fuel and is driven by a combustion gas generated by combustion of the fuel;
a heat recovery steam generator for generating steam by utilizing heat of an exhaust gas from the gas turbine;
a fuel supply facility for supplying ammonia as the fuel to the gas turbine; and
a control device including a fuel flow rate calculation unit and a temperature control system,
wherein the fuel supply facility includes:
 a liquid ammonia line connected to an ammonia tank for storing liquid ammonia,
 a warm water line through which warm water flows,
 a high-temperature water line through which high-temperature water flows,
 a vaporizer connected to an end of the liquid ammonia line for heating and vaporizing the liquid ammonia via heat exchange between the high-temperature water from the high-temperature water line and the liquid ammonia,
 a heat exchanger for performing heat exchange between the high-temperature water in the high-temperature water line and a medium,
 a heat exchange amount regulator for regulating a heat exchange amount between the high-temperature water and the medium to adjust a temperature of the high-temperature water flowing into the vaporizer,
 a temperature sensor for measuring the temperature of the high-temperature water flowing into the vaporizer from the heat exchange amount regulator,
 a gaseous ammonia line for leading gaseous ammonia, which is ammonia vaporized in the vaporizer, to the gas turbine,
the vaporizer has an ammonia inlet, an ammonia outlet, a high-temperature water inlet, and a warm water outlet,
the liquid ammonia line is connected to the ammonia inlet of the vaporizer,
the gaseous ammonia line is connected to the ammonia outlet of the vaporizer,
the warm water line has a warm water heater that is disposed in the heat recovery steam generator and that heats the warm water via heat exchange between the warm water and the exhaust gas,
the high-temperature water line connects the warm water heater and the high-temperature water inlet of the vaporizer, and
the heat exchanger is provided in the high-temperature water line,
wherein a required power output for the gas turbine from an outside is input into the fuel flow rate calculation unit to generate a fuel flow rate command, the temperature of the high-temperature water from the temperature sensor and the fuel flow rate command are input into the temperature control system to determine an operation amount of the heat exchange amount regulator and the temperature control system instructs the heat exchange amount regulator on the operation amount.

2. The gas turbine plant according to claim 1,
wherein the high-temperature water line has a main high-temperature water line that connects the high-temperature water inlet of the vaporizer and the warm water heater, and a branch high-temperature water line branched from the main high-temperature water line and then connected back to the main high-temperature water line,
the heat exchanger is provided in the branch high-temperature water line, and
the heat exchange amount regulator has a flow rate ratio regulator that regulates a ratio between a flow rate of the warm water flowing between a branch position of the branch high-temperature water line and a connection position of the branch high-temperature water line and a flow rate of the warm water flowing through the branch high-temperature water line, in the main high-temperature water line.

3. The gas turbine plant according to claim 1,
wherein the heat exchange amount regulator includes a medium flow rate regulator that regulates a flow rate of the medium flowing into the heat exchanger.

4. The gas turbine plant according to claim 1,
wherein the vaporizer has a heat transfer tube that has the high-temperature water inlet and the warm water outlet and through which the high-temperature water flows, and a vaporizer casing that covers the heat transfer tube and is capable of temporarily storing the liquid ammonia,
the vaporizer casing has the ammonia inlet and the ammonia outlet, and
the liquid ammonia line is connected to the ammonia inlet of the vaporizer casing, and the gaseous ammonia line is connected to the ammonia outlet of the vaporizer casing.

5. The gas turbine plant according to claim 1,
wherein the heat recovery steam generator includes a boiler casing through which the exhaust gas from the gas turbine flows, and a plurality of heat transfer tubes that are disposed in the boiler casing and through which water or steam flows,
the plurality of heat transfer tubes are arranged in a flow direction of the exhaust gas within the boiler casing, and
the warm water heater is disposed, in the boiler casing, at a position overlapping the heat transfer tube on a most downstream side in the flow direction of the exhaust gas among the plurality of heat transfer tubes, in the flow direction of the exhaust gas, or at a position on the further downstream side.

6. The gas turbine plant according to claim 1,
wherein the control device further includes a pressure control system that determines the operation amount of the heat exchange amount regulator such that pressure of the gaseous ammonia flowing into the gas turbine falls within a pressure range determined in advance, and that instructs the heat exchange amount regulator on the operation amount.

7. The gas turbine plant according to claim 1, wherein the warm water line includes a warm water pump for maintaining a flow rate of the high-temperature water flowing into the vaporizer from the high-temperature water inlet of the vaporizer constant.

8. A method for supplying fuel to a gas turbine plant that includes a gas turbine that burns fuel and is driven by a combustion gas generated by combustion of the fuel, and a heat recovery steam generator capable of generating steam by utilizing heat of an exhaust gas from the gas turbine, the method comprising:
 a warm water heating step of performing heat exchange between warm water in a warm water heater disposed in the heat recovery steam generator and the exhaust gas outside the warm water heater in the heat recovery steam generator to heat the warm water into high-temperature water flowing out of the warm water heater;
 a heat exchange step of performing heat exchange between the high-temperature water heated in the warm water heating step and a medium;
 a heat exchange amount regulating step of regulating a heat exchange amount between the high-temperature water heated in the warm water heating step and the medium;
 a temperature measuring step of measuring the temperature of the high-temperature water downstream of the heat exchange step;
 a fuel flow rate command generation step of inputting a required power output for the gas turbine from an outside into a fuel flow rate calculation unit to generate a fuel flow rate command;
 a temperature control step of controlling regulation of the heat exchange amount in the heat exchange amount regulating step based on the fuel flow rate command and the temperature of the high-temperature water from the temperature measuring step;
 a vaporization step of performing heat exchange between the high-temperature water after the heat exchange amount with the medium has been regulated in the heat exchange amount regulating step and liquid ammonia from an ammonia tank storing the liquid ammonia to vaporize the liquid ammonia in a vaporizer; and
 a fuel supply step of supplying gaseous ammonia, which is ammonia vaporized in the vaporization step, to the gas turbine as fuel,
 wherein in the heat exchange amount regulating step, a temperature of the high-temperature water flowing into the vaporizer is regulated by regulating the heat exchange amount between the high-temperature water and the medium in the heat exchange step.

9. The method for supplying fuel to a gas turbine plant according to claim 8,
 wherein the heat exchange amount regulating step includes a flow dividing step of dividing the high-temperature water heated in the warm water heating step into main high-temperature water and branch high-temperature water, and
 a flow rate ratio regulating step,
 in the heat exchange step, heat exchange between the branch high-temperature water and the medium is performed, and
 in the flow rate ratio regulating step, a ratio between a flow rate of the main high-temperature water and a flow rate of the branch high-temperature water after heat exchange in the heat exchange step is regulated, and the main high-temperature water and the branch high-temperature water after heat exchange in the heat exchange step are merged with each other.

10. The method for supplying fuel to a gas turbine plant according to claim 8,
 wherein the heat exchange amount regulating step includes a medium flow rate regulating step of regulating a flow rate of the medium that heat-exchanges with the high-temperature water in the heat exchange step.

11. The method for supplying fuel to a gas turbine plant according to claim 8, further comprising:
 a pressure control step of controlling the heat exchange amount in the heat exchange amount regulating step such that pressure of the gaseous ammonia flowing into the gas turbine falls within a pressure range determined in advance.

12. The method for supplying fuel to a gas turbine plant according to claim 8,
 wherein, in the vaporization step, a flow rate of the high-temperature water flowing into the vaporizer after the heat exchange amount thereof with the medium has been regulated is maintained constant.

* * * * *